(12) United States Patent
Keller et al.

(10) Patent No.: US 8,863,137 B2
(45) Date of Patent: Oct. 14, 2014

(54) SYSTEMS AND METHODS FOR AUTOMATED PROVISIONING OF MANAGED COMPUTING RESOURCES

(75) Inventors: Alexander Keller, New York, NY (US); Remi Badonnel, Verdun (FR)

(73) Assignee: International Business Machines Corporation, Armonk, NY (US)

( * ) Notice: Subject to any disclaimer, the term of this patent is extended or adjusted under 35 U.S.C. 154(b) by 2418 days.

(21) Appl. No.: 11/234,761

(22) Filed: Sep. 23, 2005

(65) Prior Publication Data

US 2007/0083588 A1 Apr. 12, 2007

(51) Int. Cl.
*G06F 9/46* (2006.01)
*G06Q 10/00* (2012.01)
*G06F 9/50* (2006.01)
*G06Q 10/06* (2012.01)
*H04L 29/14* (2006.01)

(52) U.S. Cl.
CPC ............ *G06F 9/5038* (2013.01); *G06F 9/5077* (2013.01); *G06Q 10/06* (2013.01); *H04L 69/40* (2013.01)
USPC ........................................... 718/104; 705/1.1

(58) Field of Classification Search
CPC ..... G06F 9/5077; G06F 9/5038; G06Q 10/06; H04L 69/40
USPC ......................................................... 718/104
See application file for complete search history.

(56) References Cited

U.S. PATENT DOCUMENTS

| | | | | |
|---|---|---|---|---|
| 6,044,394 A | * | 3/2000 | Cadden et al. | 718/107 |
| 6,338,072 B1 | * | 1/2002 | Durand et al. | 718/104 |
| 7,640,348 B2 | * | 12/2009 | Atwal et al. | 709/229 |
| 7,650,608 B2 | * | 1/2010 | Patel et al. | 719/328 |
| 2002/0013777 A1 | * | 1/2002 | Diener | 707/1 |
| 2002/0107914 A1 | * | 8/2002 | Charisius et al. | 709/203 |

FOREIGN PATENT DOCUMENTS

WO   WO 0219226 A1 *  3/2002

* cited by examiner

*Primary Examiner* — Camquy Truong
(74) *Attorney, Agent, or Firm* — F. Chau & Associates, LLC; Louis J. Percello, Esq.

(57) ABSTRACT

Systems and methods are provided for automated provisioning of managed resources in a distributed computing environment. Automated provisioning of managed resources is realized by systems and methods that support automated execution of provisioning workflows through programmatic invocation of provisioning tasks (sequentially and/or parallel invocation) supported by a provisioning system, as well as automated control and coordination of task execution and exception handling through automated message exchange. Systems and methods support automated provisioning through seamless integration of provisioning and change management systems, whereby provisioning systems can automatically interpret and execute reusable change plans that are generated (on-the-fly) by change management systems. The change plans comprise provisioning workflow processes that are described using a standard, platform-independent workflow language.

28 Claims, 8 Drawing Sheets

SYSTEMS AND METHODS FOR AUTOMATED PROVISIONING OF MANAGED COMPUTING RESOURCES

TECHNICAL FIELD

The present invention relates, in general, to systems and methods for providing automated provisioning of managed resources in a distributed computing environment and, more particularly, to systems and methods for automated provisioning of managed resources through automated execution of provisioning workflows that support programmatic invocation of provisioning tasks (sequentially and/or parallel invocation) supported by a provisioning system, as well as automatic control and coordination of task execution and exception handling through automated message exchange.

BACKGROUND

In general, computing resources and services of large-scale IT platforms and other distributed network computing environment must be effectively and efficiently managed to ensure optimal and reliable performance. One aspect of network management involves provisioning of managed computing resources for purposes of, e.g., resource allocation and implementing changes and updates. For example, the provisioning of managed resources includes, e.g., deploying, installing, uninstalling, upgrading and configuring application services or otherwise implementing changes for hardware, software, network and/or storage resources. The process of formulating change plans and provisioning of managed resources to implement such changes is not trivial, and such processes are typically very complex, time-consuming, repetitive and error-prone especially for large-scale IT computing environments. Indeed, provisioning can be burdensome and can take relatively long periods of time due to the fact that, e.g., the complex interdependencies between applications and their supporting services are not made explicit, thus requiring human involvement and expertise. Moreover, conventional service provisioning systems are essentially isolated from the change management process. Conventional provisioning systems typically employ proprietary workflow/scripting languages, which makes it difficult for a change manager to formulate reusable change plans that can be understood by different provisioning systems.

For example, conventional provisioning systems typically provide a GUI (graphical user-interface) that allows system administrators to define and execute provisioning scripts. A provisioning script typically consists of a sequence of pre-defined activities (provisioning operations) that can be manually adapted and customized by an administrator, as well as aggregated into new scripts. For instance, a sequence of pre-defined activities for provisioning a website may include steps such as creating a temporary installation directory, copying an installation image of an HTTP (Hypertext Transfer Protocol) server, uncompressing a software package, launching the installation, updating a configuration file, copying and installing web site content (HTML pages, pictures etc.), configuring access rights, starting the HTTP server, and performing cleanup tasks once the installation has been completed successfully. For every operation, the administrator can manually specify step(s) to perform if the operation fails, such as undoing the installation or notifying the administrator.

Conventional provisioning systems that require such fine-grained definitions of provisioning operations assume that administrators have a detailed understanding of the steps involved to formulate a plan for provisioning complex, multi-tiered systems. However, a lack of knowledge about the structure of a distributed system and the dependencies between fine-grained components in the system (and therefore the interdependencies between activities in a provisioning process) often tend to make an administrator overly prudent when designing provisioning processes, thus resulting in inefficiencies. Proper change management is critical to avoid operator errors that are a major cause of network services failures. As network computing systems become more complex, it becomes increasingly important to implement methods that enable more efficient change management and provisioning processes, which support automated control and execution of change operations in a consistent error-free manner.

SUMMARY OF THE INVENTION

Exemplary embodiments of the invention generally include systems and methods for providing automated provisioning of managed resources in a distributed computing environment. More specifically, exemplary embodiments of the invention include systems and methods for automated provisioning of managed resources through automated execution of provisioning workflows that support programmatic invocation of provisioning tasks (sequentially and/or parallel invocation) supported by a provisioning system, as well as automatic control and coordination of task execution and exception handling through automated message exchange.

In one exemplary embodiment of the invention, a method is provided for automated provisioning of managed computing resources, which method includes invoking provisioning tasks of a provisioning process specified in a change plan for provisioning a managed computing resource, wherein invoking provisioning tasks comprises concurrently invoking at least two interdependent provisioning tasks; monitoring an execution status of invoked provisioning tasks, and controlling the provisioning process based on the execution status of the invoked provisioning tasks.

In another exemplary embodiment of the invention, a system is provided for automated provisioning of managed resources in a computing environment. The system includes a provisioning system having an application programming interface (API) that enables programmatic invocation of one or more provisioning tasks supported by the provisioning system to provision one or more managed resources in the computing environment, wherein the API allows provisioning tasks to be concurrently invoked to perform concurrent provisioning of managed resources.

In another exemplary embodiment of the invention, the system further comprise a workflow engine which automatically executes a change plan that specifies a provisioning workflow process. The workflow engine automatically invokes one or more provisioning tasks supported by the provisioning system as specified by the change plan. The workflow engine may be an integral part of the provisioning system, or may be a system that is independent of the provisioning system. Execution status messages are communicated between the provisioning system and the workflow engine, and the workflow engine controls the provisioning workflow process based on an execution status of invoked provisioning tasks.

In accordance with other exemplary embodiments of the invention, automated provisioning of managed computing resources is supported by systems and methods which enable seamless integration of provisioning and change management systems, whereby provisioning systems can automatically interpret and execute reusable change plans that are generated (on-the-fly) by change manager systems. The change manager system can modify the change plan based on a status of the provisioning workflow process.

In another exemplary embodiment of the invention, change plans comprise provisioning workflow processes that are described using a standard, platform-independent workflow language. The provisioning workflows specify methods for automatic and programmatic invocation of individual provisioning tasks supported by one or more provisioning systems, wherein individual provisioning tasks can be invoked sequentially or in parallel to enable concurrent provisioning of managed resources. Furthermore, the provisioning workflows specify methods for automatically monitoring execution status of provisioning processes through automated message exchange between provisioning systems and change management systems to enable control and coordination of process flow. For example, monitoring the execution status of provisioning tasks enables a workflow controller to determine whether invoked provisioning operations have completed successfully or unsuccessfully, to enforce temporal constraints (deadlines, durations) for executing provisioning operations and to determine error conditions that require corrective actions.

These and other exemplary embodiments, aspects, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary systems and methods for providing automated provisioning of managed resources in a distributed computing environment will now be described in further detail with reference to the exemplary embodiments depicted in FIGS. 1~6. It is to be understood that the exemplary systems and methods described herein may be implemented in various forms of hardware, software, firmware, special purpose processors, or a combination thereof. In one exemplary embodiment, the exemplary embodiments can be implemented in software as an application comprising program instructions that are tangibly embodied on one or more program storage devices (e.g., hard disk, magnetic floppy disk, RAM, CD Rom, DVD, ROM, flash memory, etc.), and executable by any device or machine comprising suitable architecture. It is to be further understood that since the exemplary system modules and method steps depicted in the accompanying Figures may be preferably implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
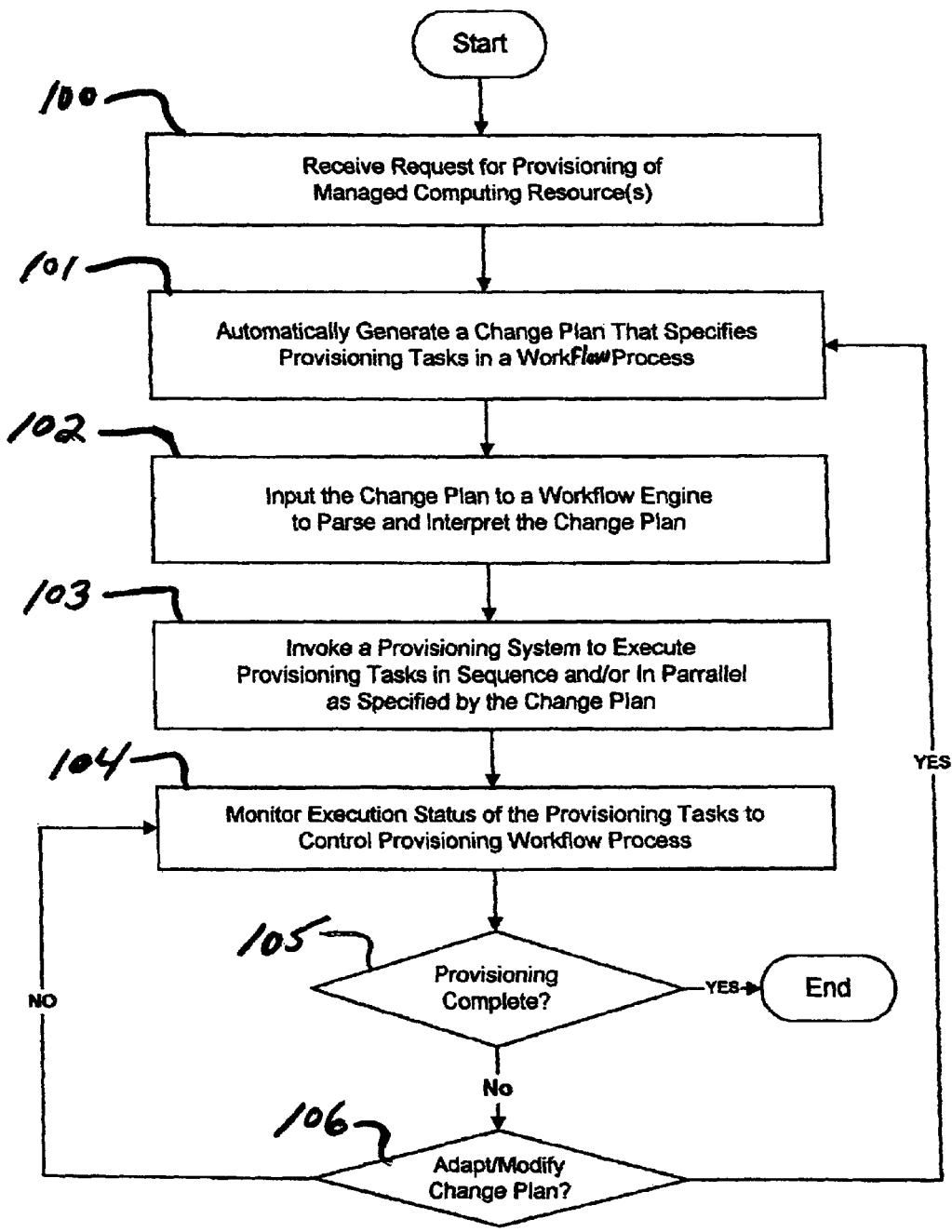
FIG. 1 illustrates method for automated provisioning of managed computing resources according to an exemplary embodiment of the invention.

Referring now to FIG. 1, a flow diagram illustrates a method for providing automated provisioning of managed computing resources according to an exemplary embodiment of the invention. A provisioning process begins with a change management system receiving a change request for provisioning one or more managed computing resources (step 100) in a given computing environment. The change request may be a request for changing or updating software, configuring or reconfiguring computing software systems, network devices or hardware components, for example. In general, provisioning methods include, but are not limited to, creating, deploying, installing, instantiating, configuring, modifying, verifying, uninstalling and/or deleting managed resources. The managed computing resources may be, e.g., logical and physical components, such as software, data, storage systems, servers, server pools, services, network devices, middleware, virtual LANs (Local Area Networks), VPNs (Virtual Private Networks), files, directories, or requests, and other types of managed resources, which can vary depending on the given computing environment (e.g., data center).

The incoming change request is processed by the change management system to generate a change plan that specifies an executable provisioning workflow process for implementing the requested change(s) (step 101). In general, a change plan according to an exemplary embodiment of the invention includes the logic for programmatically invoking various provisioning tasks and controlling the execution sequence (e.g., parallel, sequential, branch, etc.) of such tasks. Further, the change plan includes logic that defines precedence constraints that link the provisioning tasks, and conditions for invoking provisioning tasks for advancing to next processing steps or rolling back to previous states in the process flow, etc.

In one exemplary embodiment of the invention, the provisioning workflow processes (as described in change plans) are authored using a standard workflow language that can be interpreted and executed by a standard workflow engine. For instance, as explained below, provisioning workflows can be authored using Business Process Execution Language for Web Services ("BPEL4WS") or other suitable XML-based grammars, which can be used to define the behavior of provisioning activities, including but not limited to, parallel execution (so-called flows), sequences, conditional branching, time-out mechanisms, as well as error and compensation handling.

The change plan is processed by a workflow engine which automatically validates, interprets and executes the change plan (step 102). The workflow engine will automatically invoke provisioning tasks of one or more provisioning systems, in accordance with the provisional workflow specified in the change plan (step 103). Depending on the control flow specified in the change plan, provisioning tasks can be invoked sequentially and/or invoked in parallel to provide concurrent provisioning of managed resources. In accordance with one exemplary embodiment of the invention (such as described below with reference to FIG. 2), the workflow engine can be a integral component of the provisioning system which automatically invokes provisioning tasks that are supported by the provisioning system through an API (application program interface) of the provisioning system. In another exemplary embodiment of the invention (such as described below with reference to FIG. 3), the workflow engine may be an application that is developed and deployed independent of the provisioning system, but which is utilized in a network to execute a change plan and automatically invoke provisioning tasks of a provisioning system that are exposed through a suitable API (or wrapper API).

While the provisioning workflow process (specified by the change plan) is being executed, the process flow is automatically monitored and controlled to ensure that the provisioning tasks are invoked and executed in the correct order and/or, under specified conditions, and to identify error conditions, etc. (step 104). More specifically, in one exemplary embodiment of the invention, the provisioning system will monitor the execution status of the provisioning process and communicate status information to the workflow engine. The workflow engine uses the status information to control the timing and sequence of provisioning task invocation and for reporting workflow status information to the change management system. The change management system uses the workflow status information to assess the actual progress of the provisioning process against the change plan and perform on-line change plan adjustments (re-computing the change plan) in circumstances where, for example, the provisioning process runs behind schedule or if errors arise during execution of the provisioning process. In addition, these feedback mechanisms enable the change manager to accumulate knowledge regarding task execution to thereby allow reusable change plans to be optimized over time.

The provisioning workflow process will proceed until the process is completed (affirmative determination in step 105). While the provisioning process is being executed, the execution status will be monitored to identify conditions or circumstances that would require the current change plan to be adapted/modified (step 106) or otherwise roll back the provisioning process to a previous state as specified in the current change plan. For instance, as noted above, the change plan manager can uses status information exchanged between the participants in the provisioning process to determine that the current change plan is to be adapted or modified (affirmative determination in step 106) if, for example, the provisioning process runs behind schedule or if errors arise during execution of the provisioning process. In such instance, the change manager can generate a new/modified change plan (return to step 101), which is then executed to continue the provisioning process appropriately.

Figure 2:
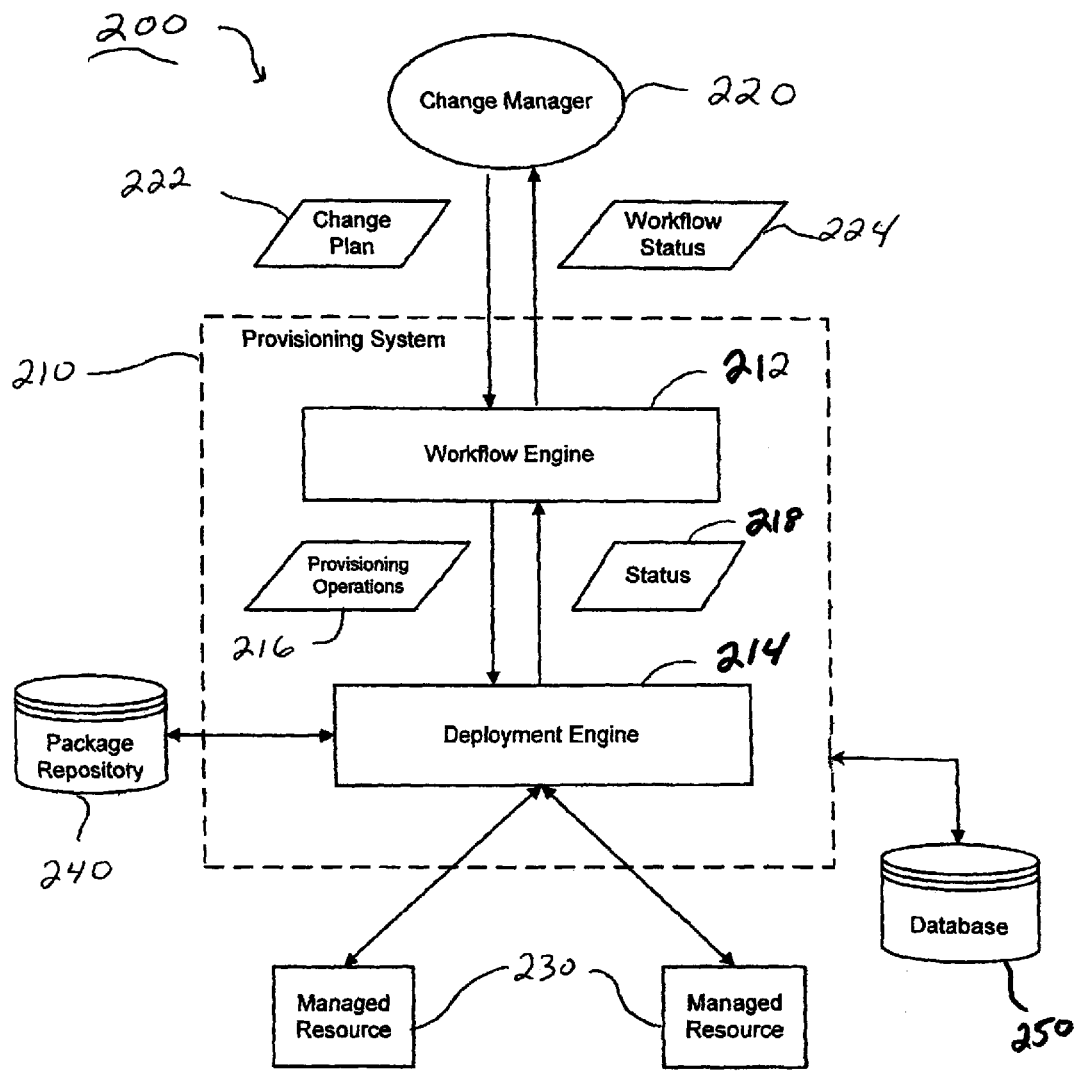
FIG. 2 illustrates a system for automated provisioning of managed resources according to an exemplary embodiment of the invention.

FIG. 2 illustrates a system (200) for providing automated provisioning of managed computing resources according to an exemplary embodiment of the invention. In particular, FIG. 2 illustrates an exemplary embodiment of a system for implementing the method of FIG. 1. In general, the system (200) comprises a provisioning system (210) and a change manager system (220). The provisioning system (210) automatically interprets and executes a change plan (222) generated by the change management system (220) to perform change management operations for provisioning one or more managed resources (230) in a distributed computing environment. The provisioning system (210) supports various types of provisioning operations that can be programmatically invoked using a suitable API to perform provisioning operations such as creating, deploying, installing, instantiating, configuring, modifying, verifying, uninstalling and deleting one or more of the managed resources (230) in a given computing environment. For instance, the provisioning system (210) can perform software installation or software configuration of one or more managed resources (230) by deploying software packages, which are persistently stored and accessible from a package repository (240), to one or more of the managed resources (230).

The managed resources (230) may include, but are not limited to, physical hardware components (such as hard disks, random access memory, central processing units, network adapters, channel controllers, etc.), logical components (disk partitions, file systems, etc.), software components (operating systems, system services such as print spoolers or name services, and end-user applications), virtualized resources (such as storage, clusters, server pools, logical server partitions, virtual private networks, virtual local area networks), files, directories, or requests. The provisioning system (210) can maintain a description of each managed resource (230) in a database (250).

In the exemplary embodiment of FIG. 2, the provisioning system (210) comprises a workflow engine (212) and a deployment engine (214). The workflow engine (212) automatically validates, interprets and executes the change plans (222) received from the change manager (220) (or change plans loaded from a data-store/repository/non-volatile storage) by generating messages to invoke one or more provisioning tasks (216) supported by the provisioning system (210). The change plans received by the provisioning system (210) may persistently stored in the database (250) or any other non-volatile storage including a repository or file system.

The deployment engine (214) performs the provisioning tasks (216) invoked by the workflow engine (212). In one exemplary embodiment of the invention, several provisioning tasks (216) may be invoked simultaneously to enable concurrent provisioning of managed resources (230).

During execution of a provisioning process, status messages (218) and (224) are exchanged for purposes of monitoring and assessing the execution status of the provisioning process. For example, status messages (218) are exchanged between the workflow engine (212) and the deployment engine (214). The status messages (218) include status requests that are issued by the workflow engine (212) to the deployment engine (214) to determine the execution status of invoked provisioning tasks. In addition, the status messages (218) include status indicators that are issued (automatically or in response to status requests) by the deployment engine (214) to the workflow engine (212) to indicate the execution status of invoked provisioning tasks. In particular, by way of example, status indicators may have values that specify execution status as "in progress", "completed successful", "completed with failure", "unknown", etc. The provisioning system (210) can use the status indicators to update the status as well as create/augment a description of a managed resource (230) stored in the database (250) during the execution of the provisioning process. The workflow engine (212) uses the status indicators (218) for controlling process flow and determining whether workflow constraints defined in the change plan (such as deadlines) are met.

The workflow status messages (224) exchanged between the workflow engine (212) and the change manager (220) allow the change manager (220) to determine if and when plan adjustments are needed in case, for example, a roll-out of changes runs behind schedule. Advantageously, the change plans include specifications to enable the workflow engine (212) to automatically perform state-checking, i.e., the workflow engine (212) determines whether certain specified conditions are met to move from activity to activity in a workflow. These conditions may be specified as temporal constraints (so-called links) that connect activities in a change plan that is expressed as a workflow, which obviates the need to develop additional program logic that would perform such checks.

It is to be understood that the system depicted in FIG. 2 can be implemented using various system architectures. For instance, in one exemplary embodiment, the provisioning system (210) may be a stand alone application (where the workflow engine (212) is an integral component) which executes on a single node of a given network. In another embodiment, the constituent components of the provisioning system (210) may be distributed over the network, where the workflow engine (212) and deployment engine (2214) execute on separate nodes. In yet another embodiment, the workflow engine (212) may be deployed as independent application that interoperates with one or more provisioning systems, or the workflow engine (212) may be an integral part (embedded) of another application which interoperates with a plurality of remote provisioning systems.

The provisioning system (210) comprises an application programming interface (API) that enables programmatic invocation of one or more provisioning tasks supported by the provisioning system (210) to provision one or more of the managed resources (230) in the computing environment. The provisioning system API allows external applications/systems to invoke individual provisioning tasks sequentially and concurrently to perform concurrent provisioning of managed resources. This is to be contrasted with conventional provisioning systems where provisioning tasks are grouped in pre-defined sequences, which are executed to perform provisioning operations.

In one exemplary embodiment of the invention, the API of the provisioning system (210) is specified using a standard programming language such as WSDL (Web Services Description Language) which allows the programmatic invocation of individual provisioning tasks using Simple Object Access Protocol (SOAP) messages, for example. In addition, the change plans (222) are described using a standard workflow language such as BPEL. In one exemplary embodiment, BPEL is a layer on top of WSDL, where WSDL is used to define specific provisional tasks supported by a provisioning system, and wherein BPEL is used to define how the provisioning tasks can be sequenced. It is to be understood, however, that other suitable programming languages can be implemented for defining the API and the access protocol, as well as the structure of the protocol messages. Indeed, other workflow, scripting, and programming languages may be used to express provisioning workflows with precedence constraints that link provisioning task and enable automated control of task execution.

Moreover, the exemplary change manager system (220) may be implemented using any suitable automated or semi-automated system for generating change plans. The change manager system may maintain a repository of standard and/or customized change plans or fragments/reusable components of such changes plans, to automatically access/create change plans that enable provisioning of known vendors' products/systems, or proprietary components/systems, etc. In other embodiments, change plans can be manually generated and input to workflow engines for processing. In this regard, the change manager (220) may be implemented using planning tools, schedulers, workflow editors, and workflow management systems, or software distribution and configuration tools.

In one exemplary embodiment of the invention, the change management process can be implemented using the systems and methods as disclosed in U.S. patent application Ser. No. 10/789,147, filed on Feb. 27, 2004, entitled "Methods and Arrangements for Automated Change Plan Construction and Impact Analysis", which is commonly assigned and fully incorporated herein by reference. Briefly, this application describes an automated Change Manager system comprising various components including a Task Graph Builder and a Planner & Scheduler. The Task Graph builder creates task graphs by parsing an incoming request for change into its elementary steps and determining an order in which the steps should be executed. A task graph is a workflow, expressed in a workflow language, consisting of tasks and precedence constraints that link the tasks together.

The Planner and Scheduler processes the task graphs (representing the various requests for change that are serviced by the change manager at a given point in time) to assign the specified tasks to available resources, according to, e.g., monetary and technical constraints, such as Service Level Agreements (SLAs), Service Level Objectives (SLOs), Service Level Specifications (SLSs), Goals, and Policies. The Planner and Scheduler computes (according to various administrator-defined criteria) a change plan that specifies deadlines and maximizes the degree of parallelism for tasks according to precedence and location constraints expressed in the task graphs. Examples of precedence constraints are: "Task X must finish before task Y can begin, Task X cannot start until task Y does, Task X cannot finish before task Y does, Task X cannot finish until task Y starts". These constraints apply to various types of change management tasks (aka change management operations), such as deploy, install, uninstall, uninstall, initialconfigure, configure, start, stop, create, delete, update, verify, or repair. Additional change management tasks or operations may be defined.

In another exemplary embodiment of the invention, a change plan may further include information that relates to the specific hardware characteristics of a target system (such as CPU speed, RAM or total/available disk space) or names and IP addresses of target systems. One of ordinary skill in the art could readily envision other types of data that may be included in a Change Plans, as well as their representation. Operational policies may be considered that define best practices. Examples of such policies are: "an application server must always be installed on a different system than a database server", "a specific version of a database management system must be present for an application server to function properly", "a servlet must be first quiesced before it can be upgraded", "on a clustered computing system, all application servers must have the same version and release levels".

Figure 3:
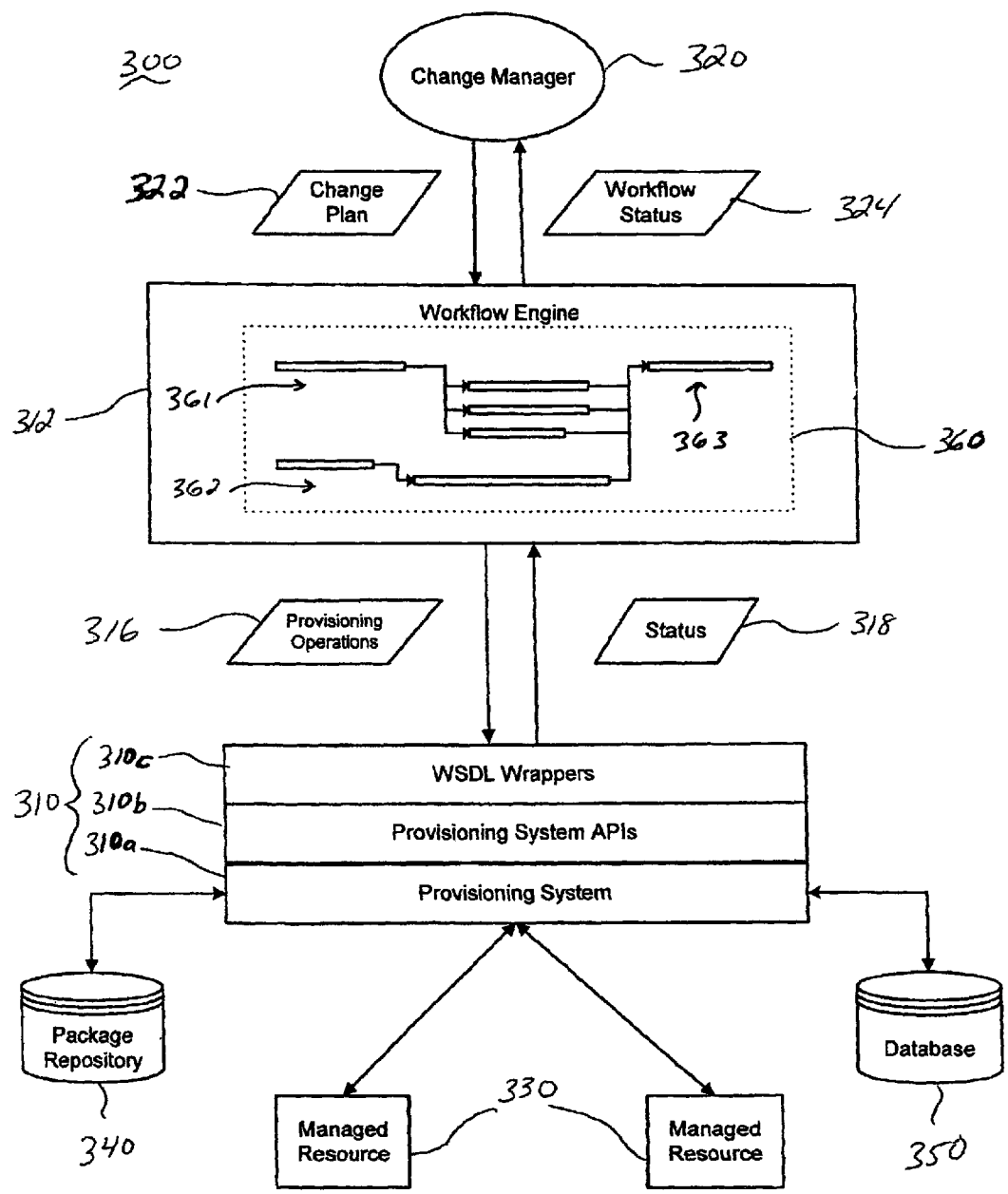
FIG. 3 illustrates a system for providing automated provisioning of managed computing resources according to another exemplary embodiment of the invention.

FIG. 3 illustrates a system (300) for providing automated provisioning of managed computing resources according to another exemplary embodiment of the invention. In particular, FIG. 3 illustrates an exemplary embodiment of a system for implementing the method of FIG. 1. In general, the system (300) comprises a provisioning system (310), workflow engine (312) and a change manager system (320). The system (300) includes a change manager (320) and workflow engine (312). The change manager (320) and workflow engine (312) are the same or similar to those corresponding components discussed above with reference to FIG. 2. However, in the exemplary embodiment of FIG. 3, the workflow engine (312) is an application that is developed and deployed independent of the provisioning system (310), and is utilized to execute a change plan (322) provided by the change manager (320) and automatically invoke provisioning tasks of a proprietary, platform-dependent provisioning system, which are exposed through a suitable API (or wrapper API).

In particular, the provisioning system (310) comprises various application layers including a core provisioning system layer (310a), an API layer (310b) and a wrapper layer (310c). The wrapper layer (310c) includes a plurality of wrappers that are created for existing provisioning system APIs (310b) to expose and enable access to provisioning tasks supported by the provisioning system (310a). In one exemplary embodiment of the invention, the wrappers (310c) are WSDL wrappers that make the provisioning system (310a) appear as a set of web services. The WSDL wrappers (310c) define the allowable set of change management operations that can be used in change plans (322). The workflow engine (312) can execute a change plan (322) (which specifies a BPEL4WS provisioning workflow) to automatically invoke one or more provisioning operations (316) (sequentially or in parallel) that are exposed by the WSDL wrappers (310c). The exemplary system architecture of FIG. 3 facilitates the seamless integration of platform-dependent provisioning systems with a standard workflow engine (312).

The provisioning system layer (310a) executes provisioning operations that are invoked by external applications (e.g., workflow engine (312) via the API layers (310b and 310c). The provisioning system layer (310a) monitors the execution status of invoked provisioning operations (316) to determine whether such tasks are still executing, or have been successfully completed, or have been completed with an error, etc. by way of example, the tasks include deployment, installation, starting and stopping of software components on managed resources (330), where installable packages for the managed resources can be accessed by the provisioning system from one or more package repositories (340). The package repository (340) may reside on the same network node as the provisioning system (310), or may be implemented as a set of federated repositories that reside on different network nodes.

The provisioning system (310) and workflow engine (312) exchange status messages (318) such as status requests issued by the workflow engine (312) and status indicators issued by the provisioning system (310) such as described above. The execution status of a provisioning process can be stored in a database (350) and accessed during execution of the provisioning process (as specified by the change plan (322)). As discussed above, the workflow engine (312) uses the execution status information to control process flow and determine whether preconditions are satisfied before triggering subsequent activities. For example, a change plan (322) may specify deadlines (e.g., task X must be finished by 8 pm) that must be enforced. Further, the workflow engine (312) generates workflow status messages to the change manager (320) to allow the change manager to assess the workflow execution status (324) of the provisioning process.

FIG. 3 schematically depicts an exemplary change plan (360) being executed within the workflow engine (312). The exemplary change plan (360) illustrates an exemplary concurrent provisioning workflow in which two sets of activities (361) and (362) are executed in parallel. The change plan may specify a condition that a final activity (363) cannot be executed until successful completion of the activity sets (361) and (362). The workflow engine (312) would determine the execution status of provisioning operations and, in turn, provide workflow status information to the change manager (320). The change manager (320) could assess the execution status (324) of the running change plan (360) and decide whether the running change plan (360) should be continued or terminated (and rolled back to a previous state) and removed from the workflow engine (312).

Figure 4A:
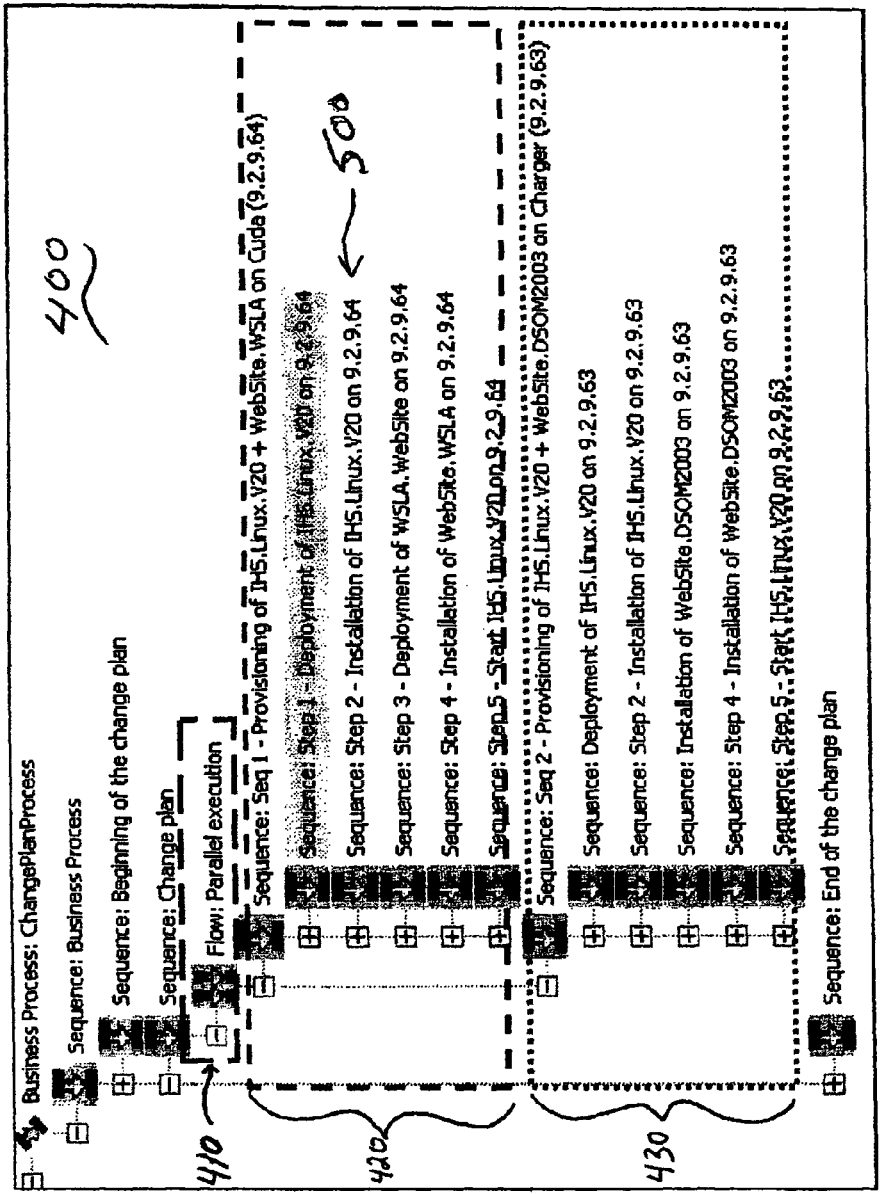
FIG. 4A illustrates a change plan that specifies concurrent provisioning of two websites, according to an exemplary embodiment of the invention.
Figure 4B:
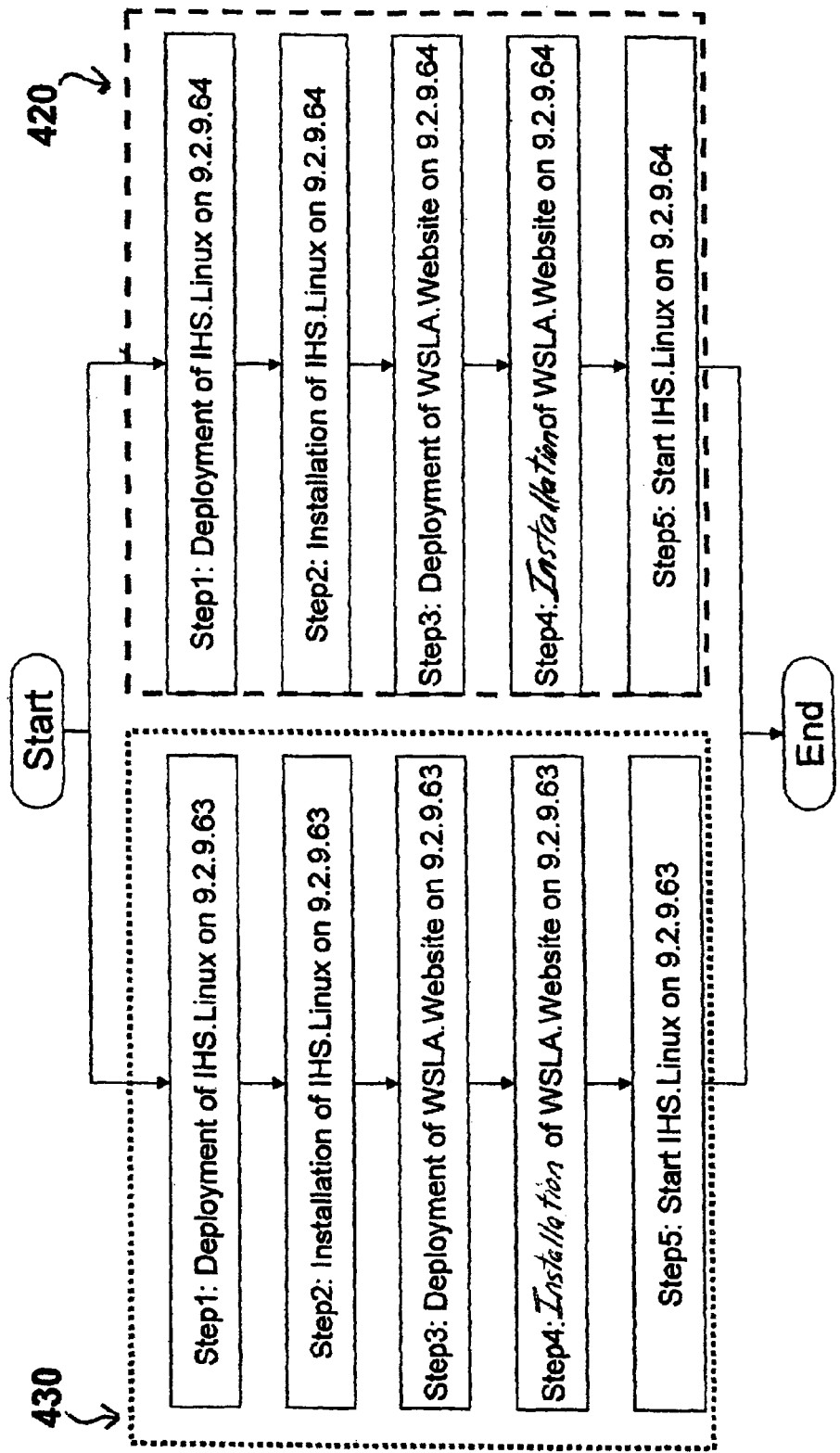
FIG. 4B is a flow diagram representation of the exemplary workflow process specified by the exemplary change plan of FIG. 4A.

An exemplary workflow process for concurrent provisioning of managed computing resources will now be explained in further detail with reference to the exemplary embodiments of FIGS. 4A and 4B. FIG. 4A depicts an exemplary change plan that specifies concurrent provisioning of two websites, according to an exemplary embodiment of the invention and FIG. 4B is a flow diagram representation of the exemplary workflow process specified by the exemplary change plan of FIG. 4A. More specifically, FIG. 4A illustrates an exemplary change plan (400) (described using BPEL4WS workflow language) which specifies several sets of activities for concurrently provisioning (deployment, installation and configuration) two websites with different content, along with IBM HTTP SERVERS (IHS) on two different systems running LINUX operating system. The exemplary change plan (400) comprises an activity set (420) that specifies a "sequence" of provisioning tasks for provisioning a website with the name "WSLA" (together with an HTTP server) on a system named "Cuda" having an IP address 9.2.9.64. In addition, the exemplary change plan (400) comprises an activity set (430) that specifies a "sequence" of provisioning tasks for provisioning a website named "DSOM2003" (together with another HTTP server) on a system named "Charger" having an IP address 9.2.9.63

In the exemplary change plan (400), the activity sets (420) and (430) include BPEL4WS "sequence" constructs to define a collection of activities that are to be performed sequentially in the order in which the activities are listed within a "sequence" element. The activity sets (420) and (430) are deemed complete when the final activity in the sequence has completed. Further, a BPEL4WS "flow" construct (410) specifies that the activity sets (420) and (430) are to be performed concurrently. The flow construct (410) specifies a decoupling of the two provisioning activity sets (420) and (430) on a per-system basis such that if the provisioning process on one system encounters a problem, the provisioning process for the other system will not be affected and continues to execute. Concurrent invocations of the change management operations (provisioning tasks) in each of the activity sets (420) and (430) can be performed because the invocation of an operation on the provisioning system through its WSDL interface is non-blocking.

It is to be understood that the concurrent provisioning process depicted in FIG. 4A is merely exemplary, and that one having skill in the relevant art will recognize that modifications in the way how provisioning activity sets are defined, the number of activity sets, as well as their representation, may be made without departing from the spirit and scope of the present invention. In particular, various criteria (resource type, change management operation type, resource ownership, etc.) may be used for grouping provisioning activities into activity sets.

The flow diagram of FIG. 4B illustrates the execution sequence of provisioning tasks in each activity set (420) and (430), wherein the activity sets (420) and (430) are executed in parallel for concurrent deployment of the web servers. As depicted in FIG. 4B, the sequence of provisioning tasks in the activity set (430) include deploying and installing a first IHS web server, deploying and installing a first WSLA website, and starting the first web server. Similarly, the execution sequence of provisioning tasks in the activity set (420) include deploying and installing a second IHS web server, deploying and installing a second WSLA website, and starting the second web server.

It is to be appreciated that a WSDL monitoring interface can be used to enforce temporal constraints that are defined in a change plan. Again, temporal constraints include, e.g., "the provisioning operation X must be finished before the provisioning operation Y can start", or "the provisioning operation X must not start before the provisioning operation Y has started", etc. As noted above, a workflow engine can determine whether an invoked provisioning operation has completed successfully and thus commence a next change management operation in the workflow. If an error occurs during the execution of a provisioning operation, the workflow engine can submit an error message to the change manager so that the change manager can determine how to proceed.

Figure 5A:
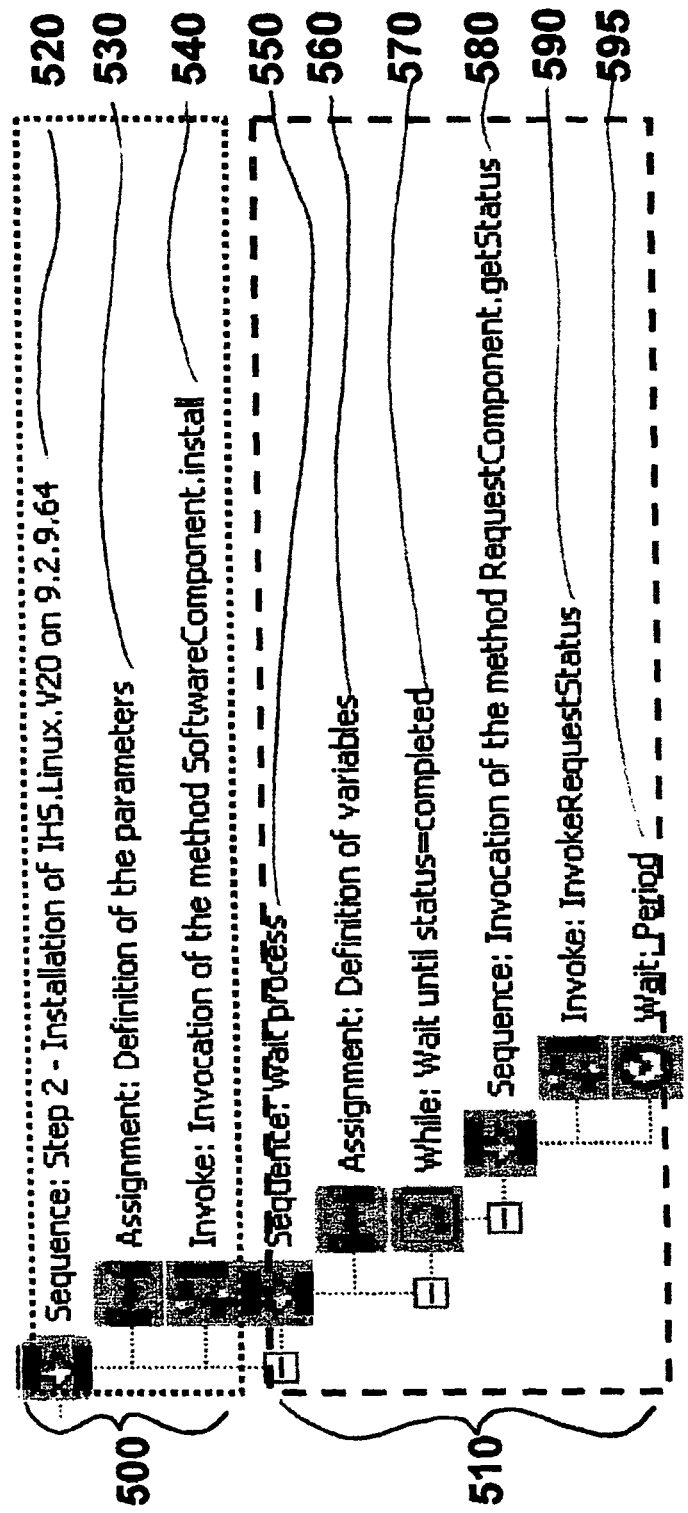
FIG. 5A illustrates change plan specifications for monitoring the task execution status, according to an exemplary embodiment of the invention.
Figure 5B:
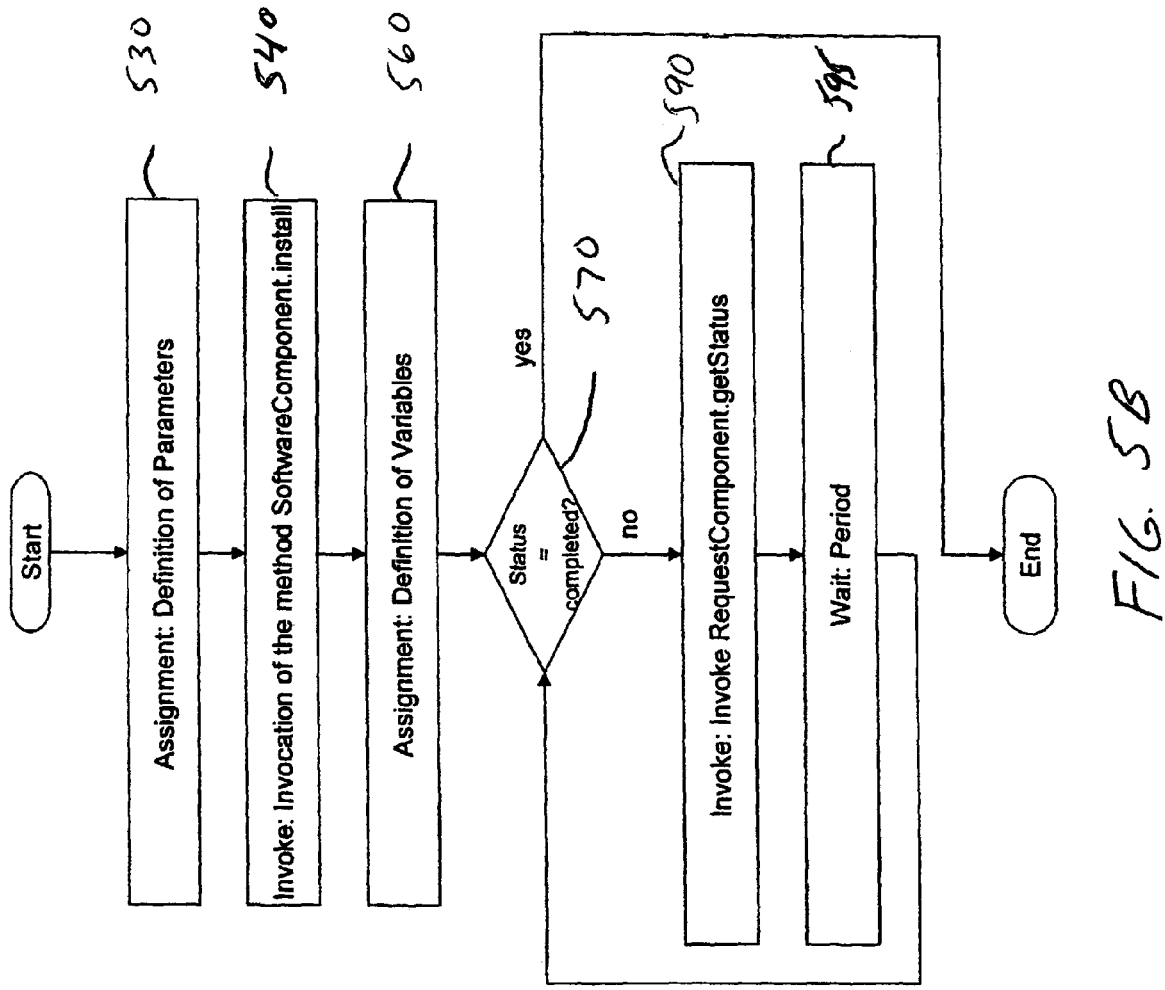
FIG. 5B is a flow diagram representation of the exemplary monitoring process as specified by the change plan in FIG. 4A.

By way of example, FIGS. 5A and 5B illustrate a method for monitoring task execution status according to an exemplary embodiment of the invention. In particular, FIG. 5A illustrates the set of provisioning operations (500) for the installation sequence Step 2 of the activity set (420), which specifies a process for monitoring task execution status to enforce temporal constraints between provisional tasks. Further, FIG. 5B is a flow diagram representation of the process flow of the provisioning operations specified in the change plan of FIG. 5A. More specifically, as depicted in FIGS. 5A and 5B, the provisioning steps (500) for the specified sequence for Installation of IHS on 9.2.9.64 (520)) include an assignment activity (530) to define parameters, as well as an invoke activity (540) to invoke (through a WSDL interface) a method referred to as "software.component.install" for installing software. The invoke operation (540) within the sequence (520) can only begin if the predecessor assignment activity (530) has finished.

To determine the execution status of the provisioning operation (540) (after the operation is invoked), the workflow engine periodically invokes the monitoring WSDL interface using a sequence (510) specified in the change plan. The sequence (510) specifies a wait process (550). A "wait" construct can be used to specify expiration criteria, e.g., waiting for a given time period or waiting until a certain time has passed. After the provisioning operation (install) is invoked (540), a request ID, which is returned by the invocation (540) to the workflow engine, is used to check (through the monitoring WSDL interface implementing a method Request-Component.getStatus (510)) the status of the running provisioning operation, until it completes. More specifically, as per the defined wait sequence (550), the request ID is—among others—assigned to a variable maintained by the workflow engine to establish the context for a subsequent invocation (560).

Once this is done, a while loop (570) is executed until the status retrieval yields a value "completed". A "while" construct is used to indicate that an activity is to be repeated until a certain success criteria has been met. Within the loop, an operation for retrieving the task execution status is invoked (590), followed by a wait operation (595) to ensure that the task execution status retrieval is performed only after a defined time period has passed (to prevent an excessive amount of status retrieval attempts). An additional sequence (580) is included which wraps the inner activities to ensure that the invoke (590) and wait (595) operations are invoked one after the other, and not concurrently.

FIG. 5B is a flow diagram representation of the process flow specified in FIG. 5A. The web server installation process includes a parameter defining process (step 530) and invocation of a software component installation method (step 540). A wait process is initiated by defining variables (step 560). A loop is initiated (step 570) to determine when the process is completed. If the process is not completed (negative determination in step 570), a method is invoked to get a current the status of the installation process (step 590). A wait period is enforced (step 595). For example, when the invocation (step 590) is performed using a synchronous, RPC (Remote Procedure Call), a wait is enforced for a predetermined time before reiteration of the loop (return to step 570) to poll for status changes. In another embodiment, an asynchronous, event-driven mechanism can be utilized to provide notification (to the workflow engine) when the status of the deployment request changes, which enables the engine to determine when and if the next activity can be commenced, or whether the engine must wait until the current activity has completed.

As noted above, provisioning systems and methods according to exemplary embodiments of the invention can define temporal constraints to specify deadlines ("must be finished by 8 PM") and durations ("must take less than 45 minutes") for performing provisioning activities and enforcing such constraints using a suitable monitoring API. In one exemplary embodiment wherein change plans are specified using BPEL and WSDL monitoring APIs are employed, "alarm" activities are used to specify and enforce deadline and duration time constraints for an activity. In general, such constraints can be specified in BPEL by placing the activity (e.g., a software installation) within a "scope" and defining a time constraint, e.g., duration—less than 5 min. If the duration exceeds the time period defined in the change plan, an "escape" activity attached to the "alarm" invokes a WSDL method of the change manage to report the violation. Such notification does not mean that the change plan is automatically aborted. Instead, the change manager will determine how to proceed based on, e.g., an assessment of the overall system state, other (competing) change plans, as well as penalties specified in Service Level Agreements or general Policies. The change manager will then decide whether the current change plan should continue or be canceled, or whether a new change plan should be generated later.

Figure 6:
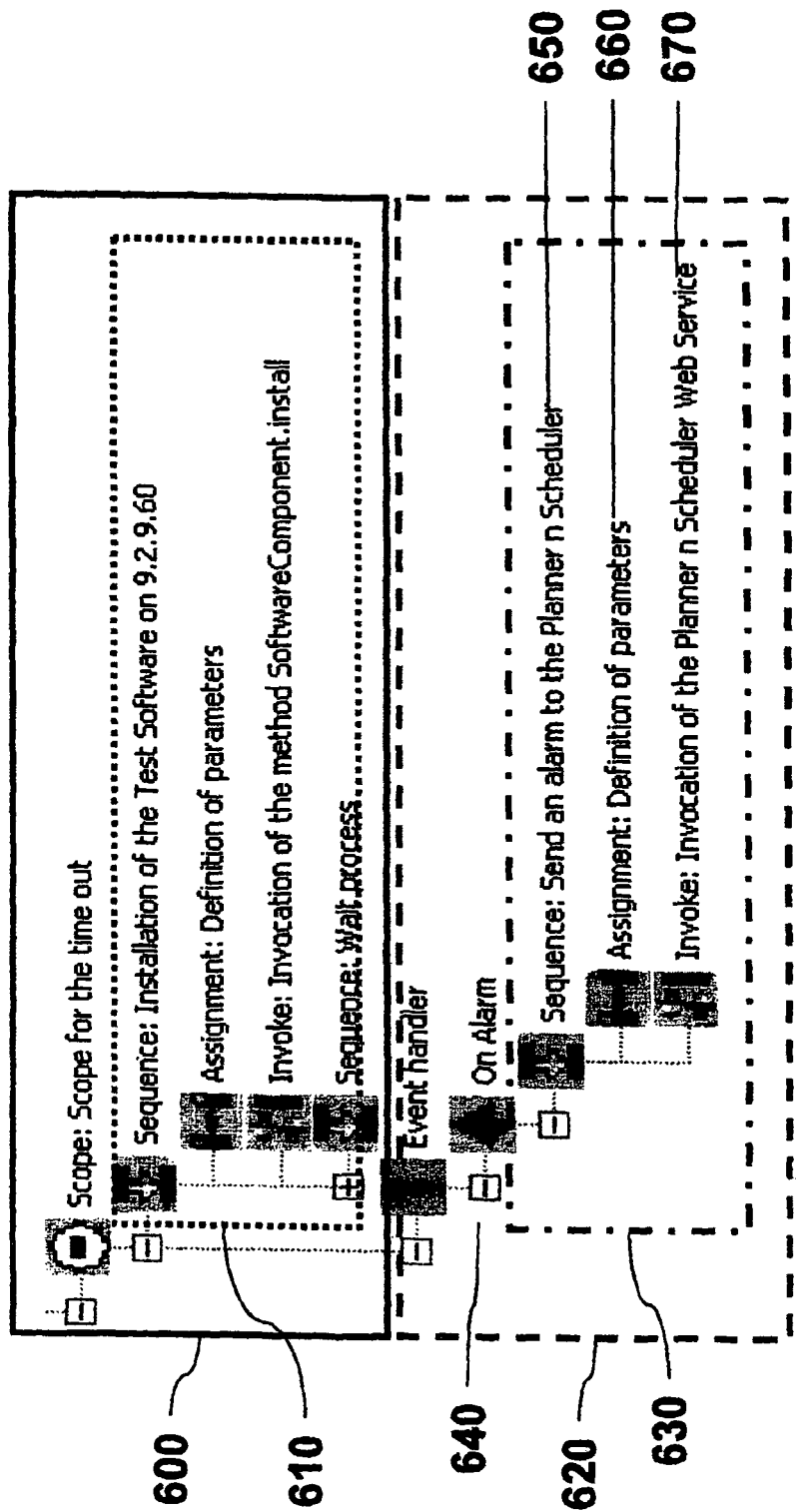
FIG. 6 illustrates a method for defining and enforcing deadline and duration constraints for provisioning activities, according to an exemplary embodiment of the invention.

FIG. 6 illustrates a process for enforcing deadlines and durations constraints in a provisioning workflow, according to an exemplary embodiment of the invention. In particular, FIG. 6 illustrates exemplary change plan description for defining and enforcing temporal deadline and duration constraints using BPEL. In one exemplary embodiment, activities corresponding to invocations of provisioning operations are grouped together using a scope structured activity (600). An event handler (620) is then attached to the scope activity, which may contain one or more alarms (640). Each alarm is defined by both a constraint and an escape activity (630) that is performed when the constraint is violated. The exemplary escape activity includes two steps. One step includes assigning parameter (660) to variables maintained by the workflow engine (such as the request ID, the time constraint, etc.). The second step include reporting a violation to the change manager by means of an invoke activity (670). These steps (660) and (670) are grouped within a sequence (650) to ensure that such steps are not executed concurrently.

It is to be appreciated that any suitable standard, platform-neutral language may be implemented for describing provisioning system APIs to support automated concurrent provisioning of managed resources, according to exemplary embodiment of the present invention. For instance, exemplary base APIs which can generate, send and request receipt of partial orders of change management tasks for a given service and host name can be specified as follows:

(i) a Software.Install(parameters) API implements an INSTALL change management operation for software components;

(ii) a Software.Update(parameters) API implements an UNINSTALL change management operation for software components;

(iii) a Software.Rollback(parameters) API implements a ROLLBACK change management operation, which is the opposite operation of UPDATE and restores a previously updated version of an artifact;

(iv) a Software.InitialConfigure(parameters) API implements an INITIALCONFIGURE change management operation, which applies basic configuration settings to a software component, which are needed to initially install such software component;

(v) a Software.Configure(parameters) API implements a CONFIGURE change management operation, which applies advanced configuration settings to a software component so that the software component can be customized.

(vi) a Software.Start(parameters) API implements a START change management operation, which instantiates a software component so that the software component becomes usable;

(vii) a Software.Stop(parameters) API implements a STOP change management operation, which makes a software component unusable;

(viii) a File.copy(parameters) API implements a COPY provisioning operation, which allows copying files from a source to a target system;

(ix) a File.delete(parameters) API implements a DELETE provisioning operation, which allows the removal of a file from a target system;

(x) a Request.getStatus(parameters) API implements a GET_STATUS provisioning operation, which allows the retrieval of the workflow status for a given request;

(xi) a Request.getStartTime(parameters) API implements a GET_START_TIME provisioning operation, which allows the retrieval of a start time for a given request; and (xii) a Request.getDuration(parameters) API implements a GET_DURATION provisioning operation, which allows the retrieval of a duration for a given request.

One of ordinary skill in the art will readily appreciate that the exemplary APIs listed above can use one or more parameters (not shown) to identify characteristics (specified in the functional Description) used by the APIS. Further, the above APIs are merely exemplary and that other provisioning system APIs may be employed to define provisioning operations for a variety of other logical and physical managed resource types, such as servers, data, storage systems, server pools, services, network devices, middleware, Virtual Local Area Networks, Virtual Private Networks, files, directories, or requests.

Although exemplary embodiments have been described herein with reference to the accompanying drawings for purposes of illustration, it is to be understood that the present invention is not limited to those precise embodiments, and that various other changes and modifications may be affected herein by one skilled in the art without departing from the scope of the invention.

What is claimed is:

1. A program storage device readable by machine, tangibly embodying a program of instructions executable by the machine to perform a method for automated provisioning of managed computing resources comprising:
receiving a change request for configuring or reconfiguring a managed computing resource including one or more computer hardware components;
processing the change request to generate a change plan that specifies an executable provisioning workflow process for implementing the requested configuring or reconfiguring of the one or more computer hardware components;
invoking provisioning tasks of a provisioning process specified in the change plan for modifying a provisioning of the managed computing resource from a previous provisioning of the one or more computer hardware components, wherein invoking provisioning tasks comprises concurrently invoking at least two interdependent provisioning tasks;
monitoring an execution status of invoked provisioning tasks;
controlling the provisioning process based on the execution status of the invoked provisioning tasks, wherein controlling the provisioning process comprises enforcing a relationship constraint between at least two provisioning tasks;
persistently storing a description of a managed resource; and
updating the description of the managed resource during the execution of the provisioning process,
wherein the managed computing additionally includes a virtualized resource,
wherein execution status messages are communicated between the provisioning system and the workflow engine, and
wherein the workflow engine controls the provisioning workflow process based on an execution status of invoked provisioning tasks.

2. The method of claim 1, wherein monitoring the execution comprises determining if an invoked provisioning task is executing, completed successfully, or completed with an error.

3. The method of claim 1, wherein controlling the provisioning process comprises enforcing a deadline for executing at least one provisioning task as specified in the change plan.

4. The method of claim 1, wherein controlling the provisioning process comprises enforcing a duration for executing at least one provisioning task as specified in the change plan.

5. The method of claim 1, wherein the change plan is dynamically generated in response to the change request.

6. The method of claim 1, wherein the provisioning process comprises creating a managed resource.

7. The method of claim 1, wherein the provisioning process comprises deleting a managed resource.

8. The method of claim 1, wherein the provisioning process comprises modifying a managed resource.

9. The method of claim 1, further comprising:
persistently storing a description of a managed resource; and
updating the description of the managed resource during the execution of the provisioning process.

10. The method of claim 1, further comprising obtaining the change plan or a portion of the change plan from a repository of reusable change plans and change plan components.

11. The method of claim 1, further comprising storing the executing change plan in a data-store.

12. The method of claim 1, further comprising modifying the change plan based on the execution status of the invoked provisioning tasks.

13. The method of claim 1, wherein the managed computing resource additionally includes software.

14. The method of claim 1, wherein the managed computing further includes a virtualized resource.

15. The method of claim 1, wherein invoking the provisioning tasks is automatically performed by a workflow engine executing the change plan to invoke provisioning tasks supported by a provisioning system.

16. The method of claim 1, wherein monitoring the task execution comprises exchanging status messages between the workflow engine and the provisioning system.

17. The method of claim 1, wherein the change plan is described using a general-purpose workflow language.

18. A system for automated provisioning of managed resources in a computing environment, the system comprising:
- a processor;
- a provisioning system having an application programming interface (API) that enables programmatic invocation of one or more provisioning tasks supported by the provisioning system to provision one or more managed resources including one or more computer hardware components in the computing environment, wherein tasks are concurrently invoked through the API to perform concurrent provisioning of managed resources, wherein the programmatic invocation comprises an execution of a program of instructions tangibly embodying the one or more provisioning task by said processor of the provisioning system, the program of instructions stored in a non-transitory program storage device;
- a change manager system that receives a change request for configuring or reconfiguring the one or more managed resources including the one or more computer hardware components in the computing environment and processes the change request to automatically generate a change plan that specifies an executable provisioning workflow process for implementing the requested change; and
- a workflow engine that automatically executes the change plan that specifies a provisioning workflow process, wherein the workflow engine automatically invokes one or more provisioning tasks supported by the provisioning system as specified by the change plan for modifying the provisioning of the one or more managed resources from a previous provisioning of the one or more computer hardware components.

19. The system of claim 18, wherein the workflow engine is an integral part of the provisioning system.

20. The system of claim 18, wherein the workflow engine is a system that is independent of the provisioning system.

21. The system of claim 18, wherein the provisioning system and workflow engine executes on different network nodes.

22. The system of claim 18, wherein execution status messages are communicated between the provisioning system and the workflow engine, wherein the workflow engine controls the provisioning workflow process based on an execution status of invoked provisioning tasks.

23. The system of claim 18, wherein workflow status messages are communicated from the workflow engine to the change manager system.

24. The system of claim 18, wherein the change manager system modifies the change plan based on a status of the provisioning workflow process.

25. The system of claim 18, wherein the API of the provisioning system is defined using WSDL (Web Services Description Language).

26. The system of claim 18, wherein the API of the provisioning system comprises a first layer provisioning system API and a second wrapper layer that exposes the provisioning tasks as Web Services using WSDL.

27. The system of claim 18, wherein the change plan is described using a general-purpose workflow language.

28. The system of claim 18, wherein the workflow engine executes provisioning tasks directly on a managed resource.

* * * * *